US008453646B2

(12) United States Patent  (10) Patent No.: US 8,453,646 B2
Patil et al.  (45) Date of Patent: Jun. 4, 2013

(54) SENSOR APPARATUS AND METHOD TO REGULATE AIR FLOW IN A POWERED AIR PURIFYING RESPIRATOR

(75) Inventors: Swapnil Gopal Patil, Maharashtra (IN); Praveen Kumar Palacharla, Andhra Pradesh (IN); Madan Mohan Reddy Dumpala, Andhra Pradesh (IN)

(73) Assignee: Honeywell International Inc., Morristown, NJ (US)

( * ) Notice: Subject to any disclaimer, the term of this patent is extended or adjusted under 35 U.S.C. 154(b) by 663 days.

(21) Appl. No.: 12/645,044

(22) Filed: Dec. 22, 2009

(65) Prior Publication Data

US 2011/0146682 A1 Jun. 23, 2011

(51) Int. Cl.
 *A62B 7/00* (2006.01)
(52) U.S. Cl.
 USPC .................................................. 128/205.23

(58) Field of Classification Search
 USPC ............... 604/67, 30, 65; 73/861.63, 861.52; 128/205.23
 See application file for complete search history.

(56) References Cited

U.S. PATENT DOCUMENTS

| 4,899,740 | A | 2/1990 | Napolitano |
| 4,905,687 | A | 3/1990 | Ponkala |
| 5,356,533 | A | 10/1994 | Nakagawa |
| 5,671,730 | A | 9/1997 | Ollila |
| 5,861,561 | A * | 1/1999 | Van Cleve et al. .......... 73/861.52 |
| 6,463,810 | B1 * | 10/2002 | Liu ............................. 73/861.63 |
| 7,690,379 | B2 * | 4/2010 | Gossweiler .............. 128/205.23 |
| 2003/0019494 | A1 | 1/2003 | Bennett et al. |
| 2003/0180149 | A1 | 9/2003 | Krugerke |

\* cited by examiner

*Primary Examiner* — Manuel Mendez
(74) *Attorney, Agent, or Firm* — Husch Blackwell LLP

(57) ABSTRACT

A probe assembly of a sensor is arranged in an airflow channel. A first probe of the assembly has an inlet. The inlet is at a first point in the airflow channel. A second probe of the assembly has an inlet. The inlet is in fluid communication with the airflow channel. The second probe inlet is closer to a surface defining a perimeter of the channel than is the first probe inlet.

17 Claims, 8 Drawing Sheets

SENSOR APPARATUS AND METHOD TO REGULATE AIR FLOW IN A POWERED AIR PURIFYING RESPIRATOR

FIELD

The invention relates to a sensor system and apparatus having a probe assembly to measure differential velocity in terms of differential pressure to control air flow in a powered air purifying respirator (PAPR).

BACKGROUND

Powered air purifying respirators utilize a powered mechanism, such as a blower, to draw ambient air through air purifying elements to remove contaminants from the ambient air. They are designed for use as respiratory protection against atmospheres with solid and liquid contaminants, gases and/or vapors where the concentrations during entry and use are not immediately dangerous to life or health and the atmosphere contains adequate oxygen to support life.

U.S. Patent Publication No. 2003/0180149, Volumetric Control For Blower Filtered Devices, refers to a control unit which determines a differential pressure between at least two measuring points. The differential pressure is converted into a control signal to vary a fan's output. The at least two measuring points can be arranged in the air flow behind a fan impeller and in front of the consumer, in particular, the breathing hood.

U.S. Pat. No. 4,899,740, Respiratory System For Use With A Hood Or Face Mask, relates to a system having a blower (battery powered, electric motor operated) connected between inlet and outlet plenums. The motor can be manually switched between high and low speed operation to supply high quantities or air upon demand caused by a high respiration rate and otherwise supply lower quantities of air sufficient for low respiration rates to extend battery life between rechargings. A differential air pressure sensing switch is responsively connected for actuation when the difference between air pressure in the outlet plenum and the pressure of ambient atmosphere is less than a pre-selected value. A battery powered audible alarm sounds upon actuation of the switch to alert the user to the approach of potentially dangerously low air pressure in the outlet plenum and consequently in the mask or hood.

U.S. Patent Publication No. 2003/0019494, Method And System Of Calibrating Air Flow In A Respirator, provides for the establishment of control set points in a true calibration protocol through the simple triggering of the microprocessor of a controller. When the trigger is initiated, the microprocessor engages and provides the logic for the calibration cycle. The calibration cycle proceeds until a second trigger terminates the process and establishes the control set point. The calibration sequence of the method relies only on an initiation and termination trigger that is facilitated by components integral to the apparatus.

DETAILED DESCRIPTION

Figure 1:
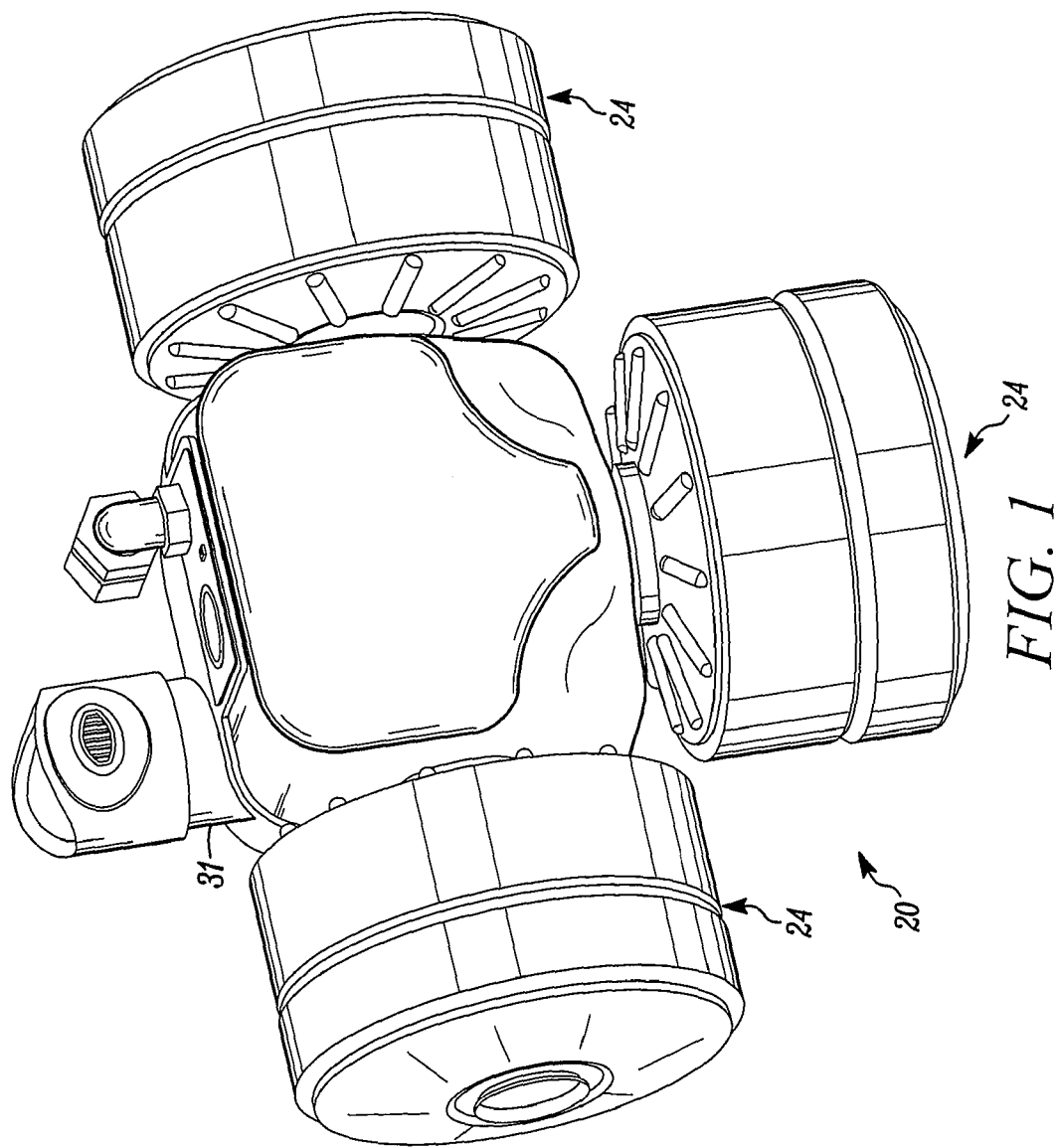
FIG. 1 is an isometric view of a powered air purifying respirator, PAPR, embodying the present invention.
Figure 2:
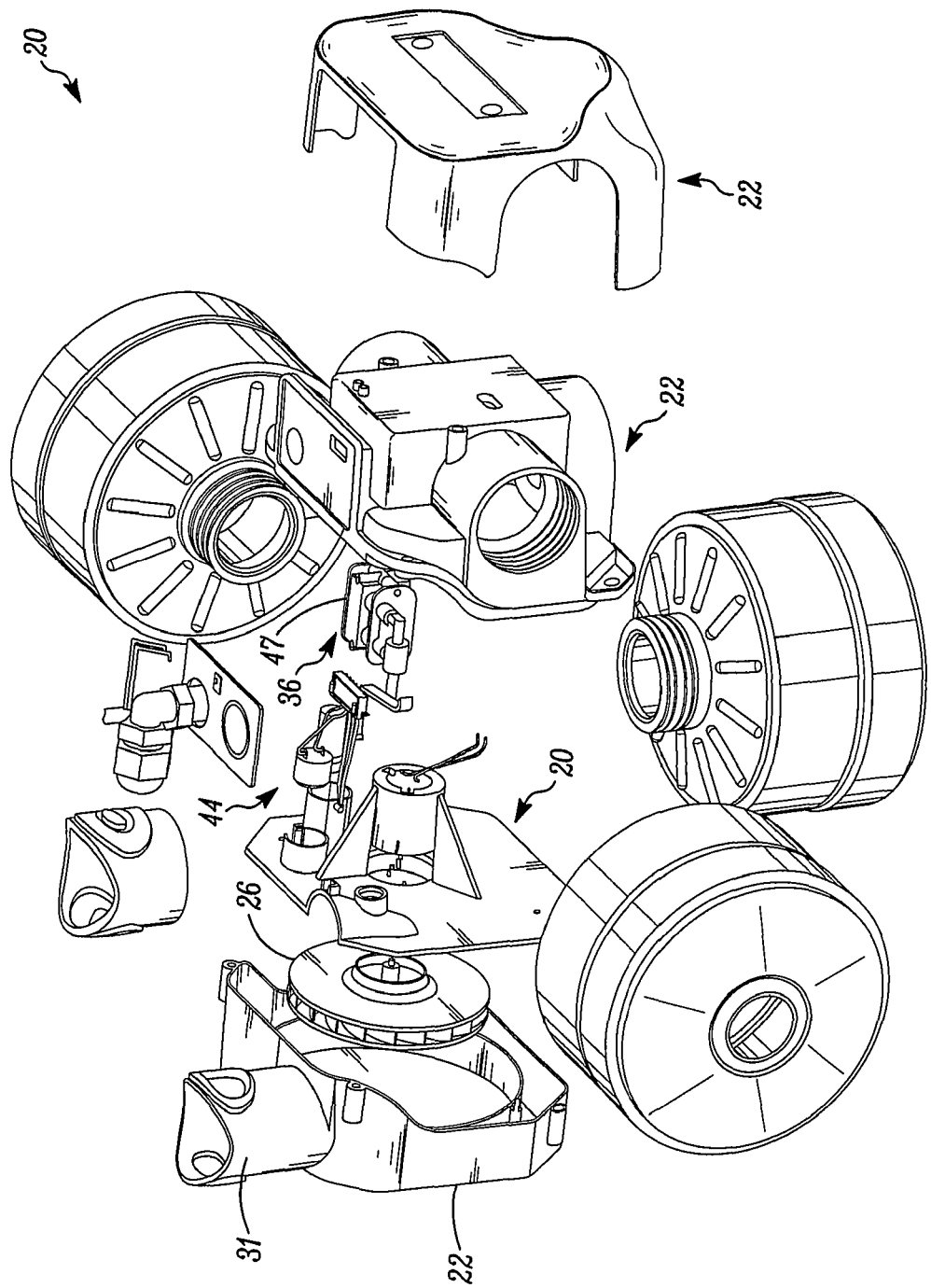
FIG. 2 is an exploded view of the powered air purifying respirator, PAPR, disclosed in FIG. 1.

The below discussion and attached drawings disclose examples of embodiments encompassing the invention. Other embodiments of the invention are contemplated and the appended claims are intended to cover such other embodiments as are within the scope and spirit of the invention.

FIGS. 1-4 show and describe an example of a partial construction of a powered air purifying respirator 20, PAPR, embodying the present invention. During operation of the PAPR ambient air is drawn into PAPR housing 22 through filter apparatuses 24 by impeller 26. The impeller 26 forces air through outlet channel 28 at an air velocity W measured in liters per minute, 1 pm. The air exits channel 28 at air outlet 30 and enters coupling tube 31 and tube or hose (not shown) and into breathing hood or mask (not shown).

Any part or all of the pathway the air takes from the time it passes into the filters 24 until it escapes into the breathing hood or mask can be considered an air flow channel. The PAPR can include all components along the air flow channel.

As the air passes through channel 28 at velocity W it passes a first point 32 in channel 28. A first probe 34 of a sensor 36 has an inlet. The inlet 34a is at first point 32. The first probe at its inlet 34a measures a stagnation pressure, negative pressure, at first point 32 caused by the air passing through channel 28. The pressure is negative because the inlet 34a faces away from the direction of the air flow in the channel. The velocity of the air at point 32 creates a negative pressure around the inlet 34a A second probe 40 of the sensor 36 has an inlet 40a at second point 42. The second probe 40 via its inlet 40a measures static pressure at second point 42 adjacent said channel 28. The second point 42 is linearly and radially outward from the first point 32. Accordingly, the second probe inlet 40a is radially outward from said first probe inlet 34a.

The air at point 32 has a particular velocity. The air at point 42 essentially has no velocity. The difference in the velocities of the air between said first point 32 and said second point 42 translates into a differential pressure. In this case the differential pressure is the difference between the negative pressure and the static pressure. Each velocity W correlates to a unique differential pressure In general there is always a difference in velocity between the air velocity measured at points which have differing distances from the center of the channel. The air generally travels faster at points toward the center of the tube versus points at the periphery of the tube. If the flow is laminar the velocity difference will be less pronounced than if it is turbulent. The term pressure includes without limitation negative pressure, stagnation pressure (positive) and static pressure. The term differential pressure includes without limitation a difference in measured pressures at two or more points The sensor 36 transmits signals which embody differential pressures between pressure at said first probe inlet 34a and pressure at said second probe inlet 40a. The signal is transmitted to an electronic apparatus 44. The electronic apparatus affects a comparison of an average measured differential pressure to a preselected value. If there is a difference between the average measured differential pressure, and the difference is greater than a preselected tolerance value, and the motor is not running at maximum speed, than the electronic apparatus generates signals to adjust motor speed.

Figure 3:
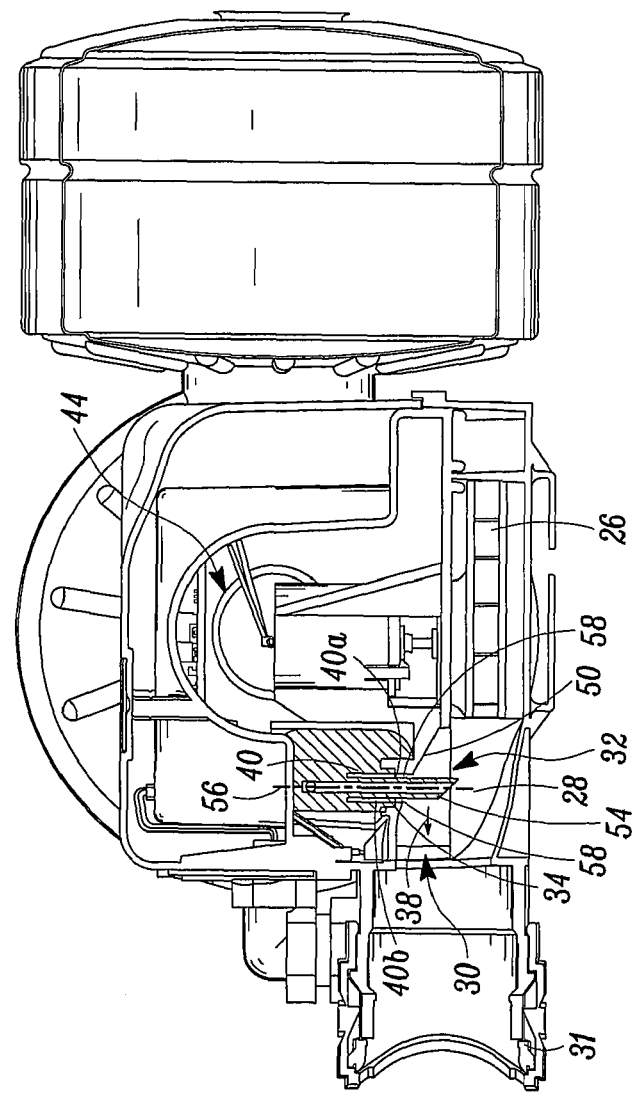
FIG. 3. is a sectional view of FIG. 1 taken along view lines A-A.
Figure 4:
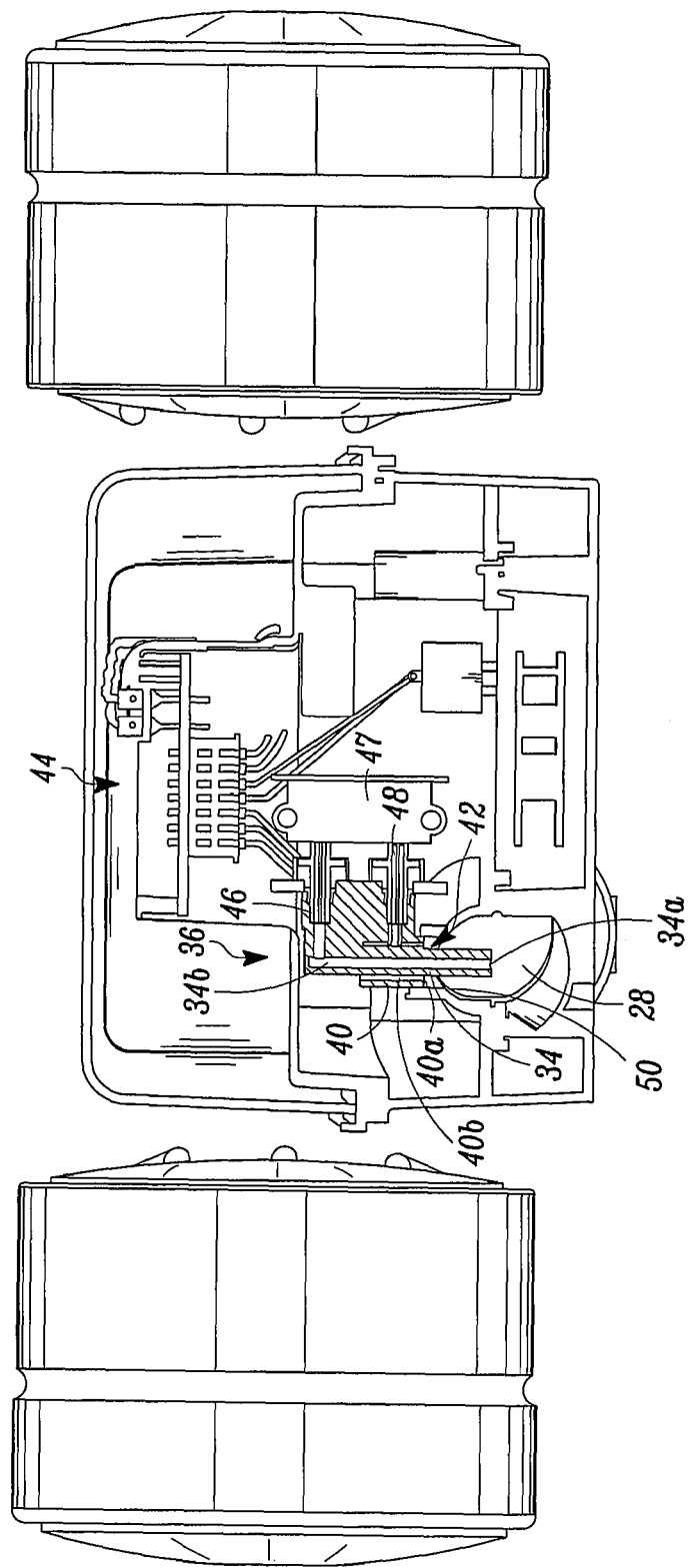
FIG. 4 is a sectional view of FIG. 1 taken along view lines B-B.

Referring now in more detail to FIGS. 3 and 4 the first probe inlet 34a of sensor 36 forms an inlet of a channel 34b in first probe 34. The probe channel 34b extends from said first inlet 34a to first inlet 46 of sensor housing 47 which holds the electronic components of sensor 36. The second probe inlet 40a forms an inlet of a channel 40b in second probe 40. The channel 40b leads to a second inlet 48 of sensor housing 47. The first probe 34 extends through the second probe channel 40b. The second probe channel 40b is concentric to the first probe 34.

The second probe inlet is linearly and radially outward and beyond of a surface 50 forming a perimeter of outlet channel 28. The first probe inlet 34a is located radially and linearly inward from said surface 50 and said second probe inlet 40a. The second probe inlet 40a is closer to surface 50 defining the perimeter of channel 28 than is first probe inlet 34a. First probe inlet 34a is closer to the center of the channel 28 than is second probe inlet 40a. A single linear axis 56 extends vertically into said first probe inlet 34a and said second probe inlet 40a. The first probe inlet is located around the midpoint of a diameter of outlet channel 28. The first probe inlet has an angled opening. The angle 54 is preferably 45 degrees relative to a longitudinal axis perpendicular to probe 34. The angle can range from 0 to 90 degrees. The opening into inlet 34a faces away from the direction of air flow 38. Having the opening 34a face away from the direction of air flow 38 better helps control for air turbulence.

As best seen in FIGS. 3-4 the first probe extends into channel 28 through single aperture 58. The second probe opens into channel 28 through aperture 58. Single aperture 58 opens into said channel 28 through said surface 50. The first probe and second probe are formed from a single seamless molded piece of plastic which is coupled to the sensor housing at the sensor housing first 46 and second inlets 48.

Figure 7:
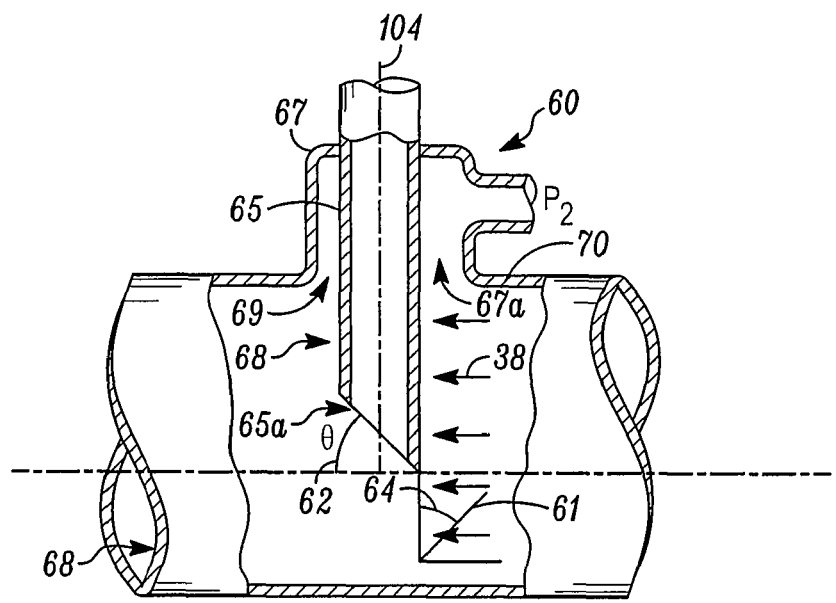
FIG. 7 is a cut away view of a basic representation of a channel of a PAPR having a probe configuration similar to that shown in FIGS. 3 and 4.

FIG. 7 shows a probe construction 60. Angle 62 of the first probe may vary from 0 to 90 degrees relative to the longitudinal axis perpendicular to first probe 65. Angle 64 may vary from 0 to 360 degrees. Angle 64 reflects the rotation of the first probe around its axis as measured from axis 61. The position of the first probe inlet 65a may extend a distance from 0 to D. The distance D is the diameter or width or height of the channel 68. There is a single aperture 69 opening into channel 68. The aperture opens through channel defining surface 70 of channel 68. The first probe 65 extends through said aperture. The second probe 67 opens into said aperture 69 and into said channel 68. The second probe inlet 67a forms aperture 69. The second probe inlet 67a and first probe inlet 65a are arranged in similar fashion to probe inlets 34a, 40a. The second probe inlet 67a is closer to surface 70 than is the first probe inlet 65a. Both inlets open into channel 68.

Figure 8:
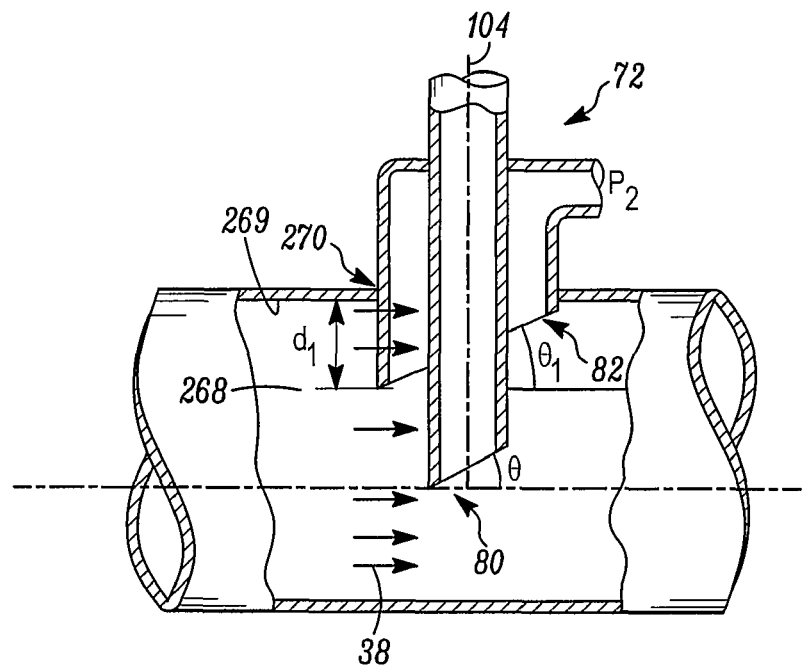
FIG. 8 is a cut away view of a basic representation of a channel of a PAPR showing an alternative probe configuration.

FIGS. 8, 9, 10 and 11 show further alternative probe constructions 72, 74, 76 and 78. FIG. 8 is similar to FIG. 7 except second probe inlet 82 extends into the channel 268 by approximately ½ the radius of the channel 268. Both the second probe inlet 82 and the first probe inlet 80 face away from the air flow direction 38 and thus measure negative pressure caused by the air traveling at a particular velocity around inlets 80, 82. The second probe inlet 82 and the first probe inlet 80 measure a stagnation pressure (negative). The stagnation (negative) pressures are however different because the inlets are at different linear and radial distances from the surface 269 defining the perimeter of the channel 268.

Figure 9:
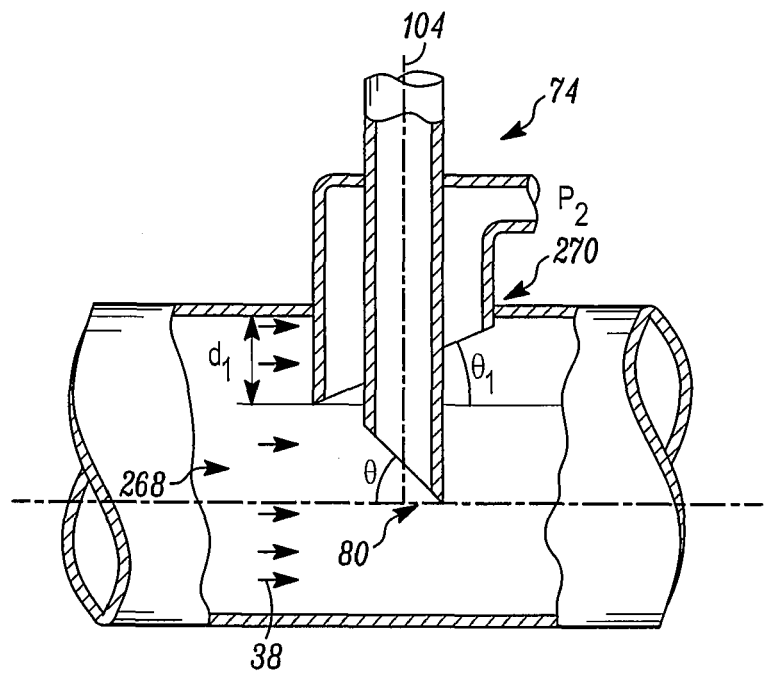
FIG. 9 is a cut away view of a basic representation of a channel of a PAPR showing an alternative probe configuration.

FIG. 9 shows an arrangement similar to FIG. 8 except the first probe inlet 80 is facing towards the flow of air 38. The inlet thus measures stagnation pressure (positive) or impact pressure caused by the velocity of the air at the point where the first probe inlet is in the tube. FIGS. 7, 8 and 9 show first and second probes extending into the PAPR's outlet channel through a single aperture 58, 69 and 270.

Figure 10:
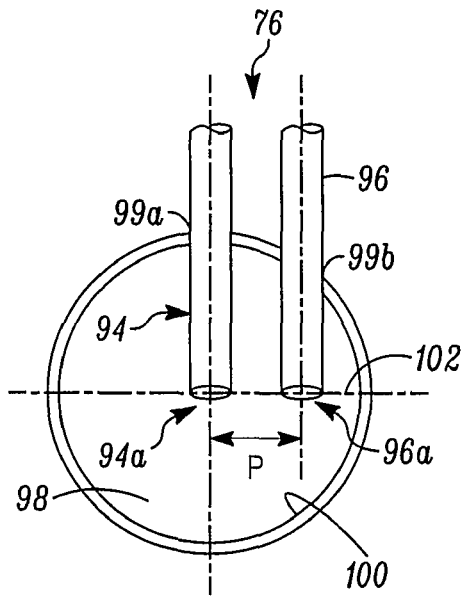
FIG. 10 is a schematic view of a channel of a PAPR showing an alternative probe configuration.
Figure 11:
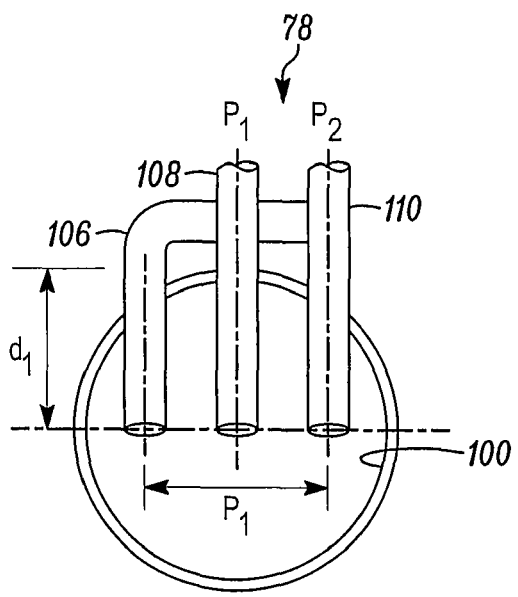
FIG. 11 is a schematic view of a channel of a PAPR showing an alternative probe configuration.

FIG. 10 shows the use of a first probe 94 and a second probe 96 wherein each of the probes enter outlet channel 98 through two different apertures 99a and 99b. The first probe is located so its inlet 94a is at a point in the channel equal to the length of the channels radius measured from the surface 100 defining the perimeter of channel 98. The second probe inlet 96a is about a length ½ the radius from the perimeter 100. The first and second probes are laterally oriented along a single axis 102 as opposed to vertically oriented along a single axis. The second probe inlet 96a is closer to the perimeter than said first probe inlet 94a. FIGS. 7, 8 and 9 are considered vertically oriented along a single axis 104. FIG. 11 shows the use of three probes 106, 108 and 110. Each probe extends through a different aperture of the surface 100 defining the channel 98. Each of the probes inlets are linearly aligned, and laterally oriented along a same radius. Probes 106 and 110 are fluidly coupled to provide a single outlet to the electronic guts of the sensor.

The probe inlets shown in all figures are all within two inches of each other.

Figure 5:
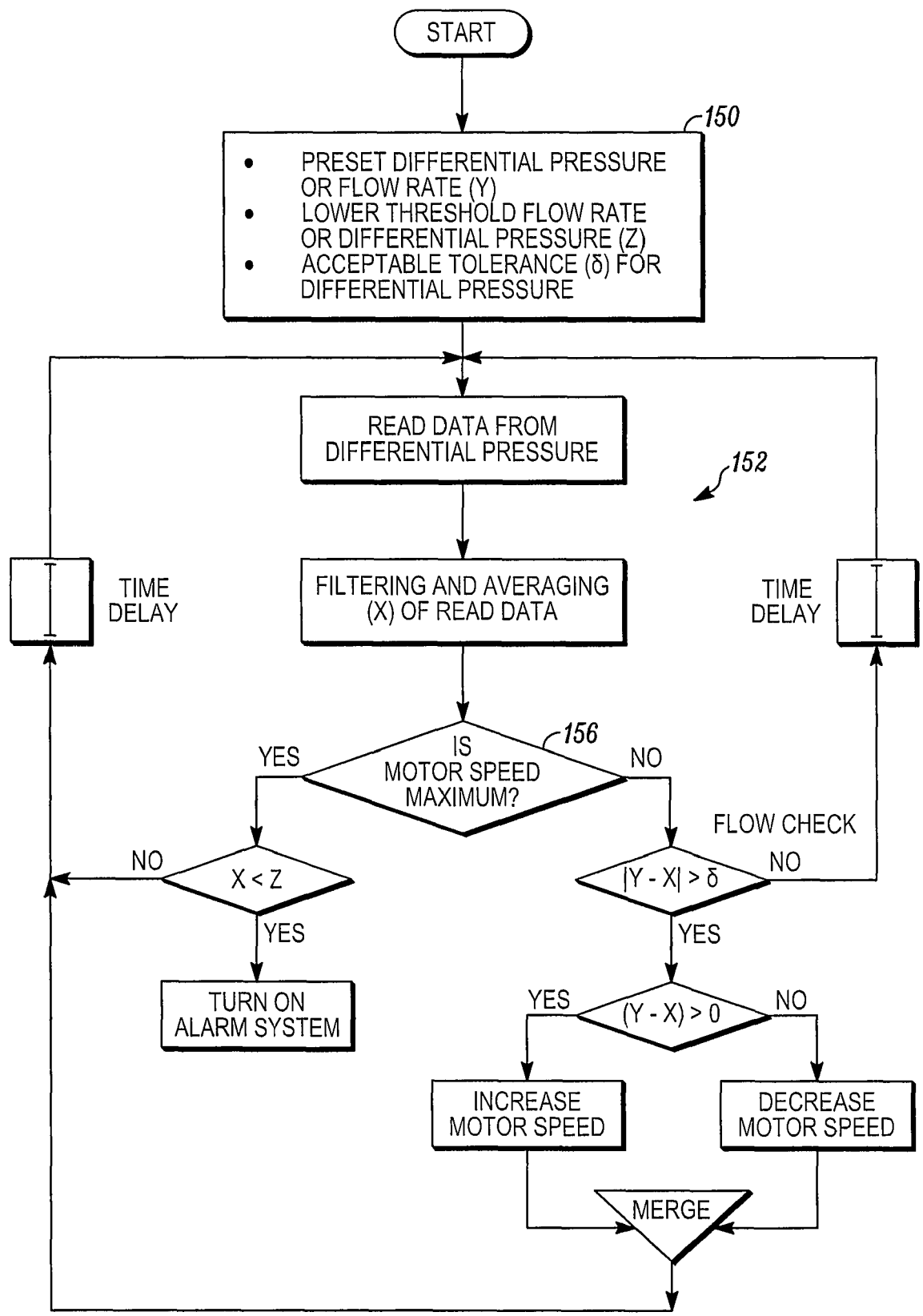
FIG. 5 is a flow diagram embodying the present invention.
Figure 6:
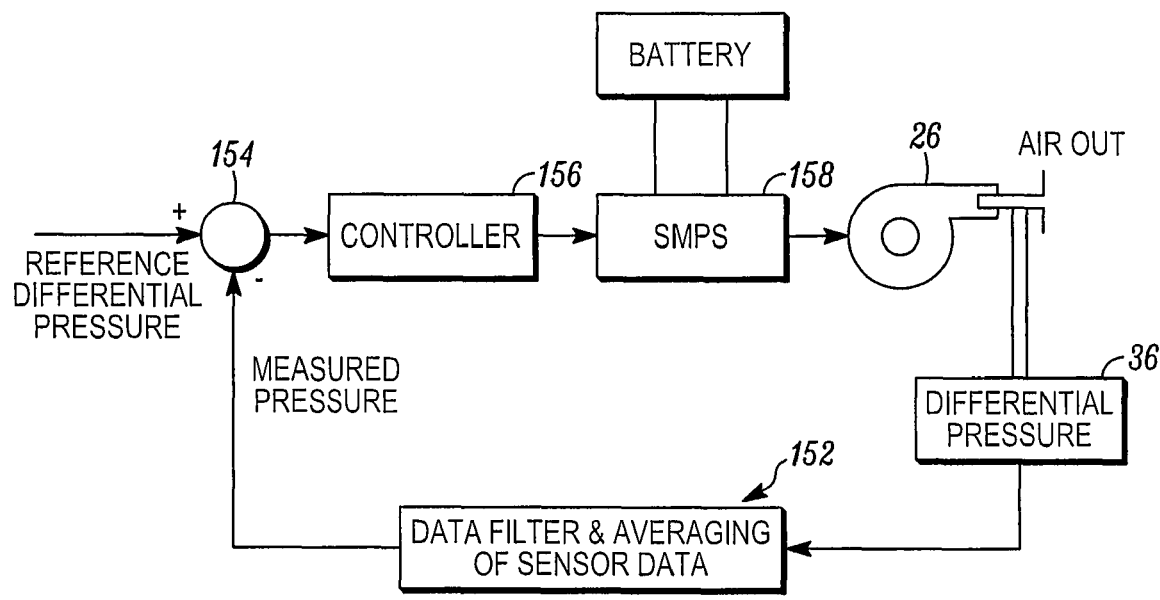
FIG. 6 is a schematic of a respirator system embodying the present invention.

Referring now to FIGS. 5 and 6, the electronic apparatus has a memory component 150 having stored data from which a desired flow rate or differential pressure Y maybe preselected. Also preselectable from the stored data is a tolerance value θ. Further, preselectable from the data, is a lower threshold flow rate or differential pressure value Z. The desired values Y, θ and Z are preselected prior to operation of the PAPR. The values are stored by the PAPR as the operating values for the PAPR. The apparatus also includes a reader, filter and data averager 152. The reader reads signals from the sensor as measured differential pressure values based on measurements from first probe inlet 34a and second probe inlet 40a. The reader reads measurements from the sensor 50 times every 0.5 seconds. The data averager averages and filters the 50 readings to provide an average pressure X. Of course different frequencies and intervals for measurements can be used to create an X value.

The electronic apparatus further has a comparator 154 and a motor speed sensor 156. If the motor speed is not a maximum, the comparator compares the average value X to the preselected value Y. If the difference between the X value and the preselected Y value is not greater than the preselected tolerance, θ than the electronic apparatus after a 10 millisecond time delay again reads, filters and averages data from the sensor to provide another X value for further comparison to the preselected Y value.

If the difference between the X and Y value is greater than the preselected tolerance value than the comparator 152 sends a signal to a controller 156 which sends a signal to switched mode power supply, SMPS 158, which adjusts motor speed. The motor speed is increased if the difference between the average value X and the preselected value Y is greater than 0. The motor speed is decreased if the difference is not greater than 0. The motor speed is adjusted to try and produce and maintain an X value within the selected tolerance θ of the selected Y value. Once the motor speed is adjusted and after a 10 millisecond delay, the reader, filter and averager calculate a further average X for comparison.

If the electronic apparatus' motor speed sensor detects the motor speed is running at maximum the X value is compared to the preselected lower threshold Z value as opposed to the preselected Y value. If the X value is less than the lower threshold Z value than an alarm sounds. If the X value is not less than the Z value, after a 0.5 second delay the reading and averaging cycles again.

What is claimed is:

1. A probe assembly of a sensor arranged in an airflow channel comprising: a first probe having a first probe inlet, said first probe inlet at a first point in said air flow channel; a second probe having a second probe inlet, said second probe inlet, in fluid communication with said airflow channel, and wherein; said first inlet and said second inlet are linearly aligned in said channel; said second probe inlet is closer to a surface defining a perimeter of said channel than is said first probe inlet.

2. The probe assembly of claim 1 wherein said first probe and said second probe have an orientation relative to a single aperture opening into said channel selected from a group of orientations consisting of: (1) said first probe extending through said single aperture and into said channel and said second probe opening into said channel at or into said aperture without said second probe extending through said aperture, and (2) said first and second probe extending into said channel through said aperture.

3. The probe assembly of claim 1 wherein the first probe inlet opens at an angle from 1 to 90 degrees relative to a longitudinal axis of said channel.

4. The probe assembly of claim 1 wherein said first probe inlet faces away from an air flow direction of said airflow channel.

5. The probe assembly of claim 1 wherein said first probe measures stagnation pressure.

6. The probe assembly of claim 1 wherein said second probe measures static pressure.

7. The probe assembly of claim 1 wherein said second probe inlet is radially outward from said first probe inlet.

8. The probe assembly of claim 1 wherein said first probe is in fluid communication with electronic components of said sensor.

9. The probe assembly of claim 1 wherein said second probe is in fluid communication with electronic components of said sensor.

10. The probe assembly of claim 1 wherein said second probe inlet is radially beyond said surface forming a perimeter of said channel.

11. The probe assembly of claim 1 wherein said first probe and said second probe are formed from a single molded piece of plastic and form a seamless construction.

12. A probe assembly of a sensor arranged in an airflow channel comprising:
(a) a first probe having a first probe inlet, said first probe inlet at a first point in said air flow channel;
(b) a second probe having a second probe inlet, said second probe inlet, in fluid communication with said airflow channel,
wherein said first probe and said second probe are arranged so said second probe is concentric to said first probe;
wherein said first inlet and said second inlet are linearly aligned in said channel;
wherein said second probe inlet is closer to a surface defining a perimeter of said channel than is said first probe inlet; and
wherein said first probe and said second probe have an orientation relative to a single aperture opening into said channel selected from a group of orientations consisting of: (1) said first probe extending through said single aperture and into said channel and said second probe opening into said channel at or into said aperture without said second probe extending through said aperture, and (2) said first and second probe extending into said channel through said aperture.

13. A method of regulating air in a PAPR comprising: arranging a first probe inlet in an outlet channel of a PAPR housing; arranging a second probe inlet to be in fluid communication with said outlet channel; arranging second probe inlet so that the first probe inlet and second probe inlet are linearly aligned; arranging said second probe inlet closer to a surface defining said outlet channel than is said first probe inlet; measuring a differential pressure between a pressure detected at said first probe inlet and a pressure detected at a second probe inlet; using said measured differential pressure in connection with regulating airflow in said outlet channel.

14. The method of claim 13 comprising the further step of: compiling, filtering and averaging an amount of measured differential pressures to provide an average measured differential pressure.

15. A method of regulating air in a PAPR comprising: arranging a first probe inlet in an outlet channel of a PAPR housing; arranging a second probe inlet to be in fluid communication with said outlet channel; arranging second probe inlet so that the first probe inlet and second probe inlet are linearly aligned; arranging said second probe inlet closer to a surface defining said outlet channel than is said first probe inlet; measuring a differential pressure between a pressure detected at said first probe inlet and a pressure detected at a second probe inlet; using said measured differential pressure in connection with regulating airflow in said outlet channel; and sensing if a motor of said PAPR is running at maximum speed.

16. A method of regulating air in a PAPR comprising:
(a) arranging a first probe inlet in an outlet channel of a PAPR housing; arranging a second probe inlet to be in fluid communication with said outlet channel;
(b) arranging second probe inlet so that the first probe inlet and second probe inlet are linearly aligned;
(c) arranging said second probe inlet closer to a surface defining said outlet channel than is said first probe inlet;
(d) measuring a differential pressure between a pressure detected at said first probe inlet and a pressure detected at a second probe inlet;
(e) using said measured differential pressure in connection with regulating airflow in said outlet channel;
(f) compiling, filtering and averaging an amount of measured differential pressures to provide an average measured differential pressure
(g) comparing said average measured differential pressure to a preselected threshold airflow speed or differential pressure and sounding an alarm if said average measured differential pressure is less than said preselected threshold.

17. A method of regulating air in a PAPR comprising:
(a) arranging a first probe inlet in an outlet channel of a PAPR housing; arranging a second probe inlet to be in fluid communication with said outlet channel;
(b) arranging second probe inlet so that the first probe inlet and second probe inlet are linearly aligned;

(c) arranging said second probe inlet closer to a surface defining said outlet channel than is said first probe inlet;
(d) measuring a differential pressure between a pressure detected at said first probe inlet and a pressure detected at a second probe inlet;
(e) using said measured differential pressure in connection with regulating airflow in said outlet channel;
(f) compiling, filtering and averaging an amount of measured differential pressures to provide an average measured differential pressure
(g) comparing said average measured differential pressure to a preselected desired airflow speed or differential pressure, when said motor is not running at maximum speed; and
(h) adjusting motor speed if a difference between the average measured differential pressure and the preselected value is greater than a preselected tolerance value.

* * * * *